UNITED STATES PATENT OFFICE.

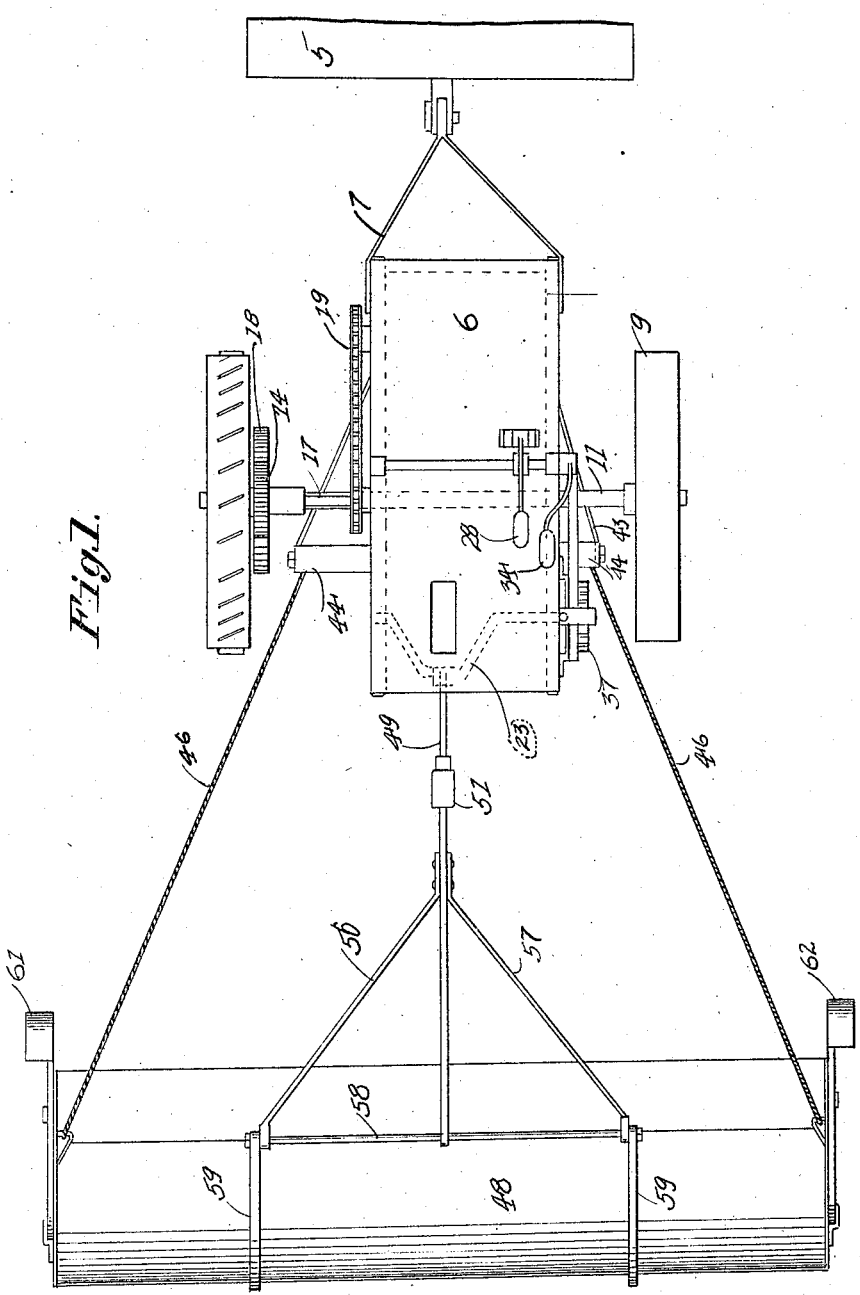

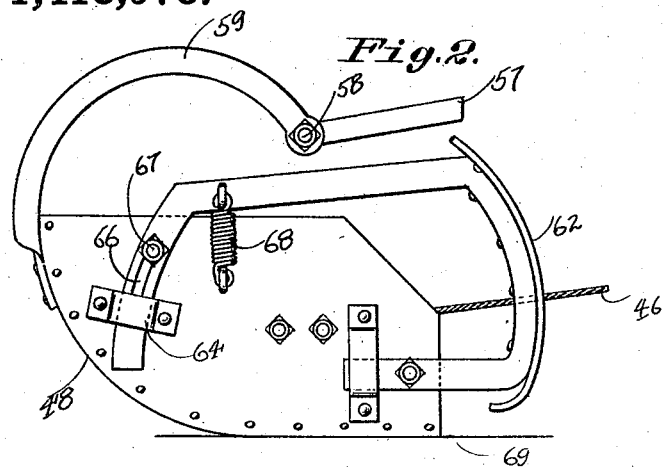
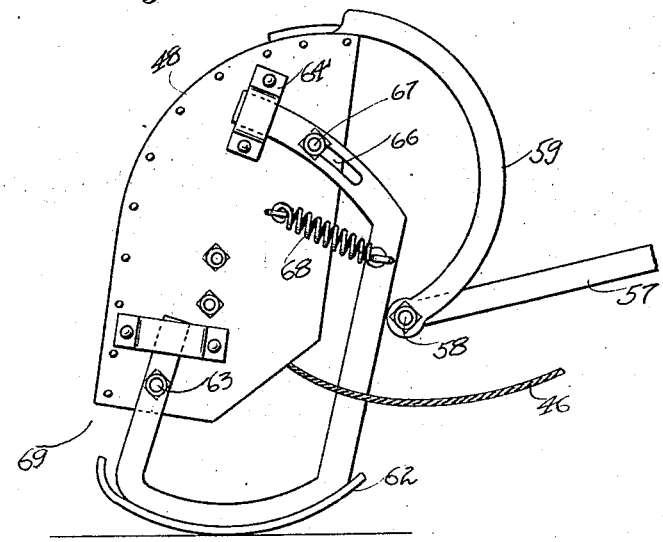
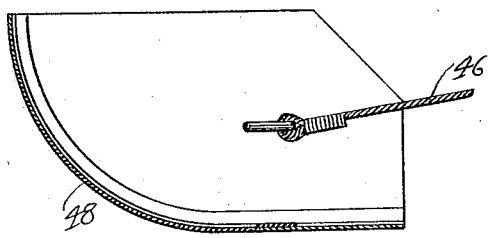

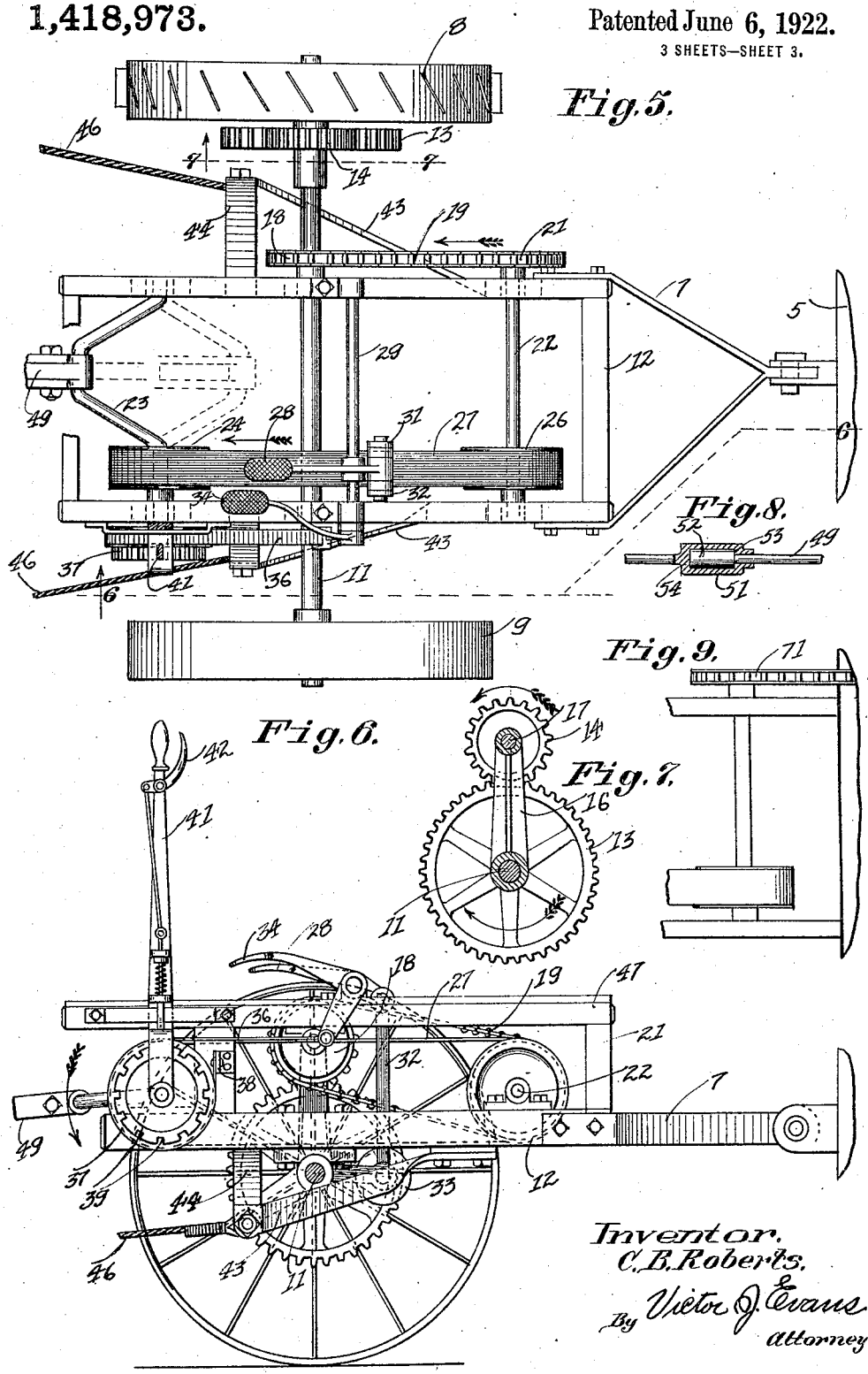

CHARLES B. ROBERTS, OF BERKELEY, CALIFORNIA.

SCRAPER.

1,418,973. Specification of Letters Patent. Patented June 6, 1922.

Application filed March 1, 1921. Serial No. 448,843.

*To all whom it may concern:*

Be it known that I, CHARLES B. ROBERTS, a citizen of the United States, residing at Berkeley, in the county of Alameda and State of California, have invented new and useful Improvements in Scrapers, of which the following is a specification.

This invention relates to improvements in scrapers, and has particular reference to a scraper adapted to be drawn behind a vehicle such as a tractor or wagon.

The principal object of this invention is to devise means whereby a scraper may be moved over the ground and at all times be under the control of the operator.

Another object of the invention is to provide means which will move a scraper into various positions without undue physical effort on the part of the operator.

A further object of this invention is to produce a device which will utilize the forward motion to deliver the power for operating the scraper.

A still further object of this invention is to produce a device which will cause all of the material within the scraper to be dumped by shaking the scraper.

Other objects and advantages of the invention will be apparent during the course of the following description:

In the drawings forming a part of this specification and in which like numerals are employed to designate like parts throughout the same, Figure 1 is a top plan view of my device attached to the rear of a tractor the end of which is diagrammatically shown.

Figure 2 is a side elevation of my scraper bucket.

Figure 3 is a side elevation of my scraper bucket in dumping position.

Figure 4 is a sectional view of a scraper bucket showing the line of draught.

Figure 5 is a top plan view partly broken away, of my scraper operating mechanism.

Figure 6 is a section taken on the line 6—6 of Figure 5.

Figure 7 is a section taken on the line 7—7 of Figure 5.

Figure 8 is a fragmentary view partly in cross-section of the scraper connecting rod.

Figure 9 is a fragmentary detail showing means for operating my device with power from a tractor.

In the drawings wherein for the purpose of illustration is shown a preferred embodiment of my invention, and referring to Figure 1, the numeral 5 designates a tractor to which is attached my scraper operating mechanism, which is designated in general by the numeral 6. This mechanism is attached to the tractor by a forked member 7, and is supported upon wheels 8 and 9, journaled upon axle 11. A suitable framework 12 is also journaled upon the axle 11 and serves to support the mechanism to be hereinafter described.

A master gear 13 is secured to one of the wheels such as 8 and is adapted to drive a gear 14 supported by a strut 16. This gear 14 serves to rotate a shaft 17 on which is mounted a sprocket 18. This sprocket 18, through the medium of a chain 19 rotates a sprocket 21 on a shaft 22 suitably journaled on the opposite end of the frame 12 from the shaft 17, a crank 23 is mounted at the opposite end of the frame and has mounted thereon a pulley 24, which pulley is in line with a pulley 26 carried on the shaft 22 while a belt 27 is adapted to pass over said pulleys 24 and 26.

A foot pedal 28 pivoted upon a cross piece 29 is connected through the medium of links 31 and 32, to an idler pulley 33, which idler pulley is adapted to be moved against the under surface of the belt 27 to cause tight engagement of the same with the pulleys before mentioned. The pedal 34 is also pivoted upon the cross piece 29 and has secured to its opposite end a band 36, which band passes about a friction drum 37 and has its end attached to a lug 38 as best shown in Figure 6. The friction drum 37 is provided with internal teeth as shown at 39, which teeth are adapted to be engaged by a spring pawl 30, normally held out of engagement therewith and carried upon the pivoted lever 41. This pawl is brought into engagement with teeth 39 through the medium of a handle 42.

The numerals 43 and 44 refer to braces secured beneath the frame 12 to which the draught lines 46 are attached. A suitable platform 47 is provided upon which the operator stands. The draught lines 46 are secured to the bucket 48 as is best shown in Figures 1 and 4.

A positioning rod 49 is secured to the crank 23 as shown in Figures 1 and 5, and extends in a rearwardly direction. This positioning rod is divided so as to give a swivel connection 51, the construction of which is shown in Figure 8, wherein the male member 52 is provided with a shoulder 53, which prevents the withdrawal from the female member 51 when drawn in one direction and which connection allows for pushing when the movement is in a reverse direction through contact of the end 54 with the interior of the female member.

The opposite end of this rod 49 is hingedly attached to the rod 59 to the bucket and also by braces 56 and 57 which pivot upon the rod 58, which rod is in turn supported by goose neck arms 59. Skids 61 and 62 are attached to the sides of the bucket as is best shown in Figures 2 and 3. These skids are pivotedly secured to the bucket 48 as at 63 and have their free end secured by a guide 64.

The movement of these skids is limited by a slot 66 which slides upon a stop 67. These skids are normally held in the position shown in Figure 1 through the medium of a spring 68 which, when expanded, takes the position shown in Figure 3.

The bucket is provided with a suitable cutting edge 69, which is common in all types of buckets of this character.

The operation of my invention is as follows:

Assuming that the parts are in positions shown in Figure 1, the tractor is moved over the ground, which causes the operating mechanism and bucket to trail behind. This trailing effects the rotation of the wheel 8, which transmits motion through the gears 13 and 14, sprocket 18, chain 19, sprocket 21, shaft 22, and pulley 26. The rotation of the pulley 22 does not cause movement of the pulley 24 because of the fact that the belt 27 is at that time loose. Should it, however, be desired to dump the bucket, the operator steps upon the pedal, which movement is transmitted through the links 31 and 32 to the idler 33, which presses upwardly upon the belt 27 thereby tightening the same and causing the pulley 24 to rotate.

This rotation is transmitted to the crank 23, which draws upon the positioning rod 49 and causes the bucket to rotate about its draught point until the skids 61 and 62 come into contact with the ground, when the bucket will be thrown entirely over into the position shown in Figure 3 and the contents thereof dumped.

The friction of the skid on the ground will overcome the effect of the spring 68 and will effect a blow on the stop 67, which stop will also prevent further movement of the skids 61 and 62. This blow will help to loosen any material which is in the bucket and at the same time the fact that the skids are resiliently supported will relieve any shocks which might be transmitted to the tractor.

The operator now releases his foot and slightly backs the vehicle, which effects a return to normal of the various parts. Should the operator at any time desire to change the inclination of the bucket, he may do so by operating the lever 42 so that the teeth 39 are engaged and then by rotating the lever 41 which will rotate the crank 23 and by placing his foot upon the lever 34, tension will be placed about the drum 37 to hold the crank temporarily in the position the operator has moved the bucket into.

Should it be desired to secure power from the tractor rather than from the wheel of the operating mechanism, the same may be accomplished by such an arrangement as shown in Figure 9, wherein the chain 71 takes the place of the chain 19 of Figure 5.

It is to be understood that the form of my invention herewith shown and described, is to be taken as a preferred example of the same, and that various changes in the shape, size and arrangement of parts may be resorted to without departing from the spirit of the invention or the scope of the subjoined claims.

What I claim and desire to secure by Letters Patent is

1. In a machine of the class described a wheeled carriage, a scraper bucket dragged by said carriage, manually controlled power actuating means on the carriage and connecting the scraper bucket for moving the same to dumping position, and returning it to scraping position, and means on the scraper bucket for jarring the load free from the bucket when the bucket is moved to dumping position.

2. In a machine of the class described a wheeled carriage, a scraper bucket dragged by said carriage, manually controlled power actuating means on the carriage and connecting the scraper bucket for moving the same to dumping position, and returning it to scraping position, said bucket having skids positioned out of contact with the ground when the bucket is in scraping position but adapted to contact with the ground when the bucket is in dumping position, and spring means on the bucket adapted to co-operate with said skids to impart a jar to the bucket to free the load carried thereby.

3. In a machine of the class described a wheeled carriage, a scraper bucket dragged by said carriage, manually controlled power actuating means on the carriage and connecting the scraper bucket for moving the same to dumping position, and returning it to scraping position, said bucket having skids positioned out of contact with the ground when the bucket is in scraping position but adapted to contact with the ground when the bucket is in dumping position, and spring means on the bucket adapted to cooperate with said skids to impart a jar to the bucket to free the load carried thereby, said actuating means for the scraper bucket including means for deriving power from the wheels of the carriage, said power means being normally inactive but adapted to be manually controlled for imparting a pull to the scraper for progressively tilting and lowering the same.

In testimony whereof I affix my signature.

CHARLES B. ROBERTS.